July 21, 1953  T. S. ASHE  2,646,479
ELECTRICAL ENERGY REGULATOR
Filed Dec. 18, 1950  5 Sheets-Sheet 1

Inventor
Thomas Stuart Ashe
By
Attorneys

July 21, 1953　　　　　T. S. ASHE　　　　2,646,479
ELECTRICAL ENERGY REGULATOR
Filed Dec. 18, 1950　　　　　　　　　　5 Sheets-Sheet 2

INVENTOR
Thomas Stuart Ashe
By Norris & Bateman
ATTORNEYS

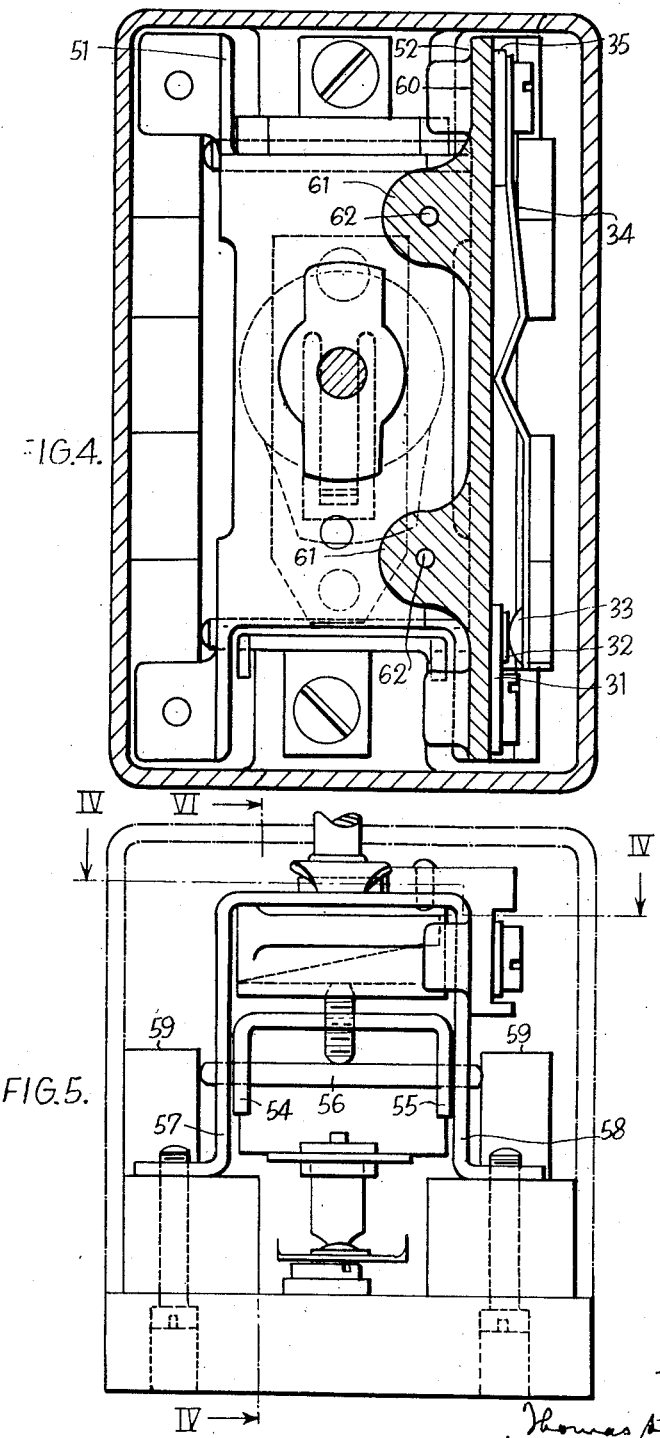

Patented July 21, 1953

2,646,479

UNITED STATES PATENT OFFICE 2,646,479

ELECTRICAL ENERGY REGULATOR

Thomas Stuart Ashe, Timperley, Altrincham, England, assignor to Sunvic Controls Limited, London, England, a company of Great Britain Application December 18, 1950, Serial No. 201,302
In Great Britain December 29, 1949

15 Claims. (Cl. 200—122)

1

This invention relates to electrical energy regulators such as are adapted for use with electric cookers, ovens and the like and more particularly to energy regulators for electric hotplates or boiling plates, that is to say electric heating devices of the kind which are adapted to heat by radiation or conduction cooking or like utensils located on or above the device. The invention moreover relates specifically to such energy regulators comprising a bimetal strip arranged to actuate mechanically a snap-action switch adapted to be connected in the hot-plate circuit, which bimetal strip is arranged to be electrically heated under control of said switch contacts so that the rate of heating said strip is changed from one value to another (one of which values may be zero) so as to maintain said bimetal strip at or near a set mean temperature and thereby to open and close alternately the hot-plate circuit and maintain a corresponding average input to the hot-plate together with mechanical means adjusting the value of said set temperature and thereby the average value of the energy supplied to the hot-plate, and means for compensating for the effect of changes in temperature of the thermally responsive device over and above the temperature changes effected by said heater element so that the average energy input to the hot-plate is determined by said adjusting means independently, or substantially independently, of variations in ambient temperature and of any thermal relation between said thermally responsive device and the hot-plate. The present invention has for its object to provide a simple and economical constructional arrangement of energy regulator of the character referred to.

The electrical energy regulator according to the present invention comprises in combination a base member of block or plate form, two bimetal strips pivotally mounted on one face of said base member and secured together at adjacent ends with the free end of one of said bimetal strips connected with a snap-action switch mounted on the base member for actuation by pivotal movement of said strips, a bridge member supported from the base member and extending over the bimetal strips, said bridge member carrying a rotary cam and operating shaft, which shaft extends away from the base member and carries or is adapted to carry at its outer end an operating knob or the like, and a cam follower lever pivotally mounted on an axis parallel or substantially parallel with the pivotal axis of the bimetal strips, said cam follower lever carrying an abutment adapted to engage with the free end of the other

2 bimetal strip and co-operating with said cam, whereby to adjust the setting of the regulator in accordance with the position of said shaft.

It will be understood that one of the bimetal strips is arranged to be heated under control of the snap-action switch whilst the other bimetal strip provides compensation for variations of ambient temperature as will hereinafter be described. For heating of the one bimetal strip the latter may be provided with a heating winding connected in series with a pair of terminals of the regulator in series with contacts of the switch, for energisation in series or parallel with the load, or may be arranged to carry current controlled by said contacts so as to be heated directly in accordance with said current, while the other bimetal strip provides compensation for variations of ambient temperature. Conveniently the two bimetal strips are disposed parallel or substantially parallel with one another, although other relative dispositions of said parts may be adopted. Thus, in preferred arrangements the bimetal strips are secured at adjacent ends to a member pivotally mounted on the base member, with said bimetal strips extending parallel or substantially parallel with one another in the same direction from said member to which the strips are secured.

According to a further feature of the invention, the bimetal strips and cam follower lever are pivotally mounted on pillars or other members upstanding from the base member and supporting or forming parts of the bridge member.

According to another feature of the invention the pivotal axes of the bimetal strips and cam follower lever are disposed perpendicularly or substantially perpendicularly to the face of the base member, or, alternatively, the bimetal strips and cam follower lever are mounted on pivotal axes parallel or substantially parallel with the face of the base member, whilst the snap-action switch is mounted on the base member, between the latter and the bimetal strips, for contact movement perpendicularly or substantially perpendicularly to the face of the base member; in the former case the bridge member may, for example, comprise a member secured to the upper ends of a pair of pillars mounted on the base member in substantially diametrically opposite positions with respect to the operating shaft, which pillars pivotally support the bimetal strips and the cam follower lever; in the latter case the bimetal strips and cam follower lever may, for example, be pivotally mounted on supporting members or supporting portions of the bridging member.

In some applications of electrical energy regulators it is desirable to provide an additional switch or switches which may, for example, be connected in circuit between a line terminal or terminals and the controlled load to provide double-pole switching for de-energising the load.

According to a further feature of the invention, an additional switch or switches for the purpose just above set forth is/are mounted on the bridge member referred to. The operating shaft may carry a further cam surface for actuating said switch or switches at the required positions of said shaft.

One embodiment of the invention will now be described by way of example with reference to the accompanying drawing, in which:

Fig. 4 is a frontal elevation of a further embodiment of the invention, Fig. 5 is an elevation taken from beneath Fig. 4, Fig. 8 is taken on the line IV—IV of Fig. 5.

Corresponding parts in the several figures are denoted by like reference numerals.

Figure 1:
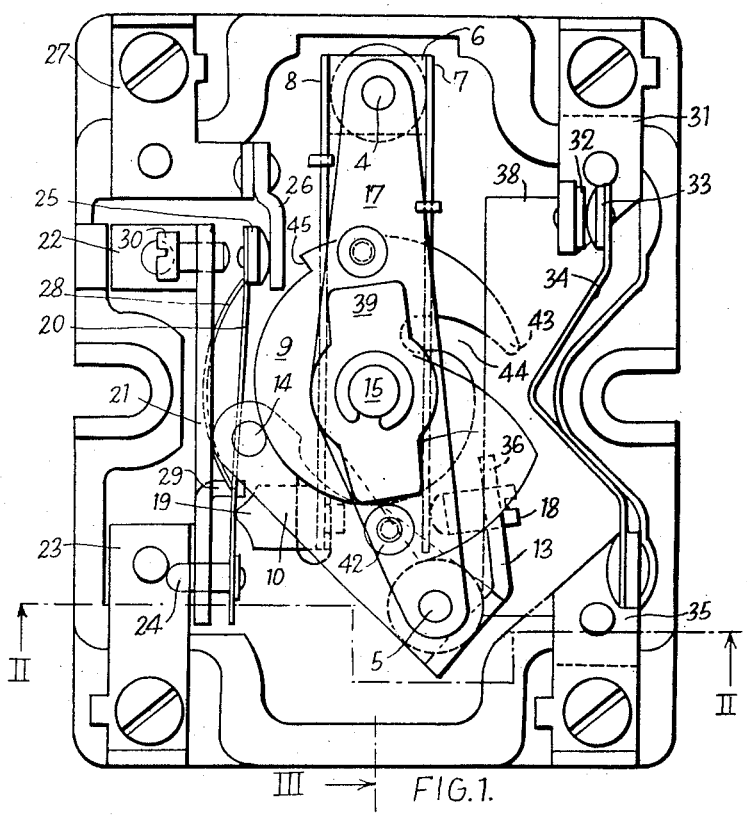
Fig. 1 is a frontal elevation of the regulator with a cover plate removed.

The regulator comprises a base member 1 of moulded insulating material, this base member conveniently being formed with an upstanding wall 2 so as in conjunction with a cover plate 3 completely to enclose the working parts of the regulator. Two metal pillars 4 and 5 are mounted on the base member 1. The pillar 4 pivotally supports thereon a block 6 to opposite faces of which are secured two bimetal strips 7 and 8, these strips being disposed parallel or substantially parallel with one another as shown. It will be seen that the assembly of the two bimetal strips extends substantially perpendicularly with respect to one edge of the base member across the central part of the latter. The arrangement includes a cam 9, which will hereinafter be described in more detail, co-operating with a cam follower lever 10 which is pivotally mounted on the pillar 5. The cam follower lever is conveniently bent from a single piece of sheet metal comprising the arm 10, a flat portion 11, a second shorter arm 12 and a tail portion 13. The arms 10 and 12 are perforated in alignment with one another, the pillar 5 extending through such perforations. The arm 10 carries at its free end a peg 14 which engages with the periphery of the cam 9.

The cam 9 is made fast to an operating shaft 15 which is journalled in a bush 16 supported by a metal strip 17 forming the bridge member hereinbefore referred to. The tail portion 13 of the cam follower lever carries an adjusting screw 18 engaging with the free end of the bimetal strip 7. The free end of the bimetal strip 8 carries an abutment 19 of insulating material which engages with the spring blade 20 of a snap-action switch. The snap-action switch comprises a base member 21 formed from sheet metal comprising, in addition to the main portion, brackets 22 and 23 by which the member is secured in place on the base member. The spring blade 20 is secured in place on the base member by means of a peg 24 which is a force fit in a perforation in the switch base and the switch blade carries at its other end a moving contact 25 co-operating with a fixed contact 26 secured to a terminal bracket 27 which also is secured to the base member 1. The spring blade 20 is formed with a slot accommodating a bowed tongue 28, of which the end remote from the contact 26 is received in a V-groove in an abutment stem 29 formed on the switch base member 21.

The axial position of the peg 24 in the member 21 is made such on assembly of the regulator that the spring blade 20 will lie to the right in Fig. 1 of the notch in the part 29 so that the bowed tongue 28, which due to its resilience tends to straighten, will urge the contact 25 into engagement with the contact 26. This is the normal position of the switch when not subjected to any force from the abutment 19. If, however, the abutment 19 is pressed to the left in Fig. 1, then the blade 20 is flexed about its point of attachment to the peg 24 so as to move to the left of said notch and, under these conditions, the tendency of the portion 28 to straighten itself will snap the contact 25 to the left out of engagement with the contact 26 and into engagement with a screw 30 forming an adjustable back stop. Release of the pressure of the abutment 19 on the blade will allow the blade to assume a configuration such that the part of said blade adjacent the part 29 returns to the right of the groove in said part with the result that the contact now returns with snap-action to engagement with the contact 26. The base member 1 carries a further terminal member 31, which in the example described carries a fixed contact 32 of a further switch, the moving contact 33 of which is carried by a spring blade 34 secured to a fourth terminal member 35 also secured to the base 1. The spring blade 34 is cranked in the manner shown in Fig. 1 and is adapted to be operated by a cam member 36 of insulating material which surrounds the bush 16 and is secured to the cam 9. The switch blade 34 is provided with an initial set biasing the moving contact 33 into engagement with fixed contact 32, whereas the cam 36 is arranged so as in the "off" position of the shaft 15 to engage the cranked part of the blade 34 and open the contacts 32 and 33.

In use the two supply lines will be connected with the terminals 27 and 31 whilst the load will be connected with the terminals 23 and 35.

A bimetal strip 7 carries a heating winding 37 which is connected between the terminals 23 and 35.

A shielding plate 38, for example of mica, is provided between the switch blade 34 and the cam 9.

The shaft is located axially, on the one hand by engagement of the cam 9 with the face of the bush 16, and on the other hand by means of a leaf spring 39 co-operating with a circlip 40 and engaging at its ends on the bridge member 17 so as to urge the shaft 15 away from the base 1. The spring 39 may be set to provide a desired degree of stiffness in the operation of the shaft 15 to guard against inadvertent movement thereof.

Figure 2:
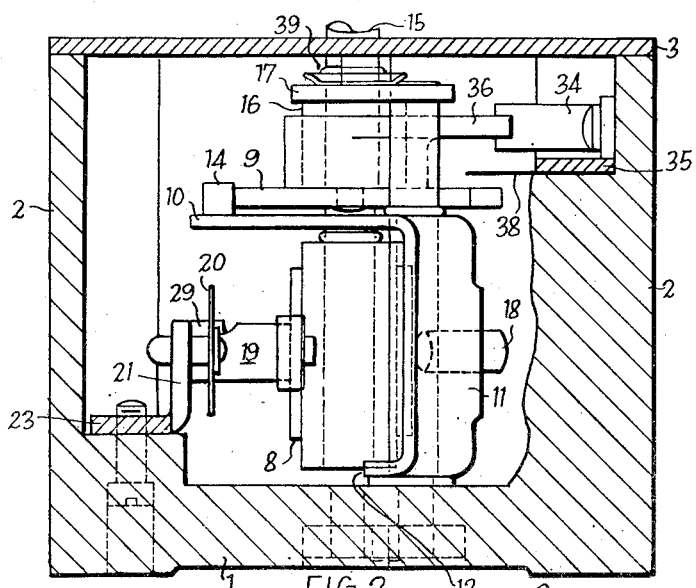
Figs. 2 and 3 are sectional elevations taken on the lines II—II and III—III, respectively, of Fig. 1.
Figure 3:
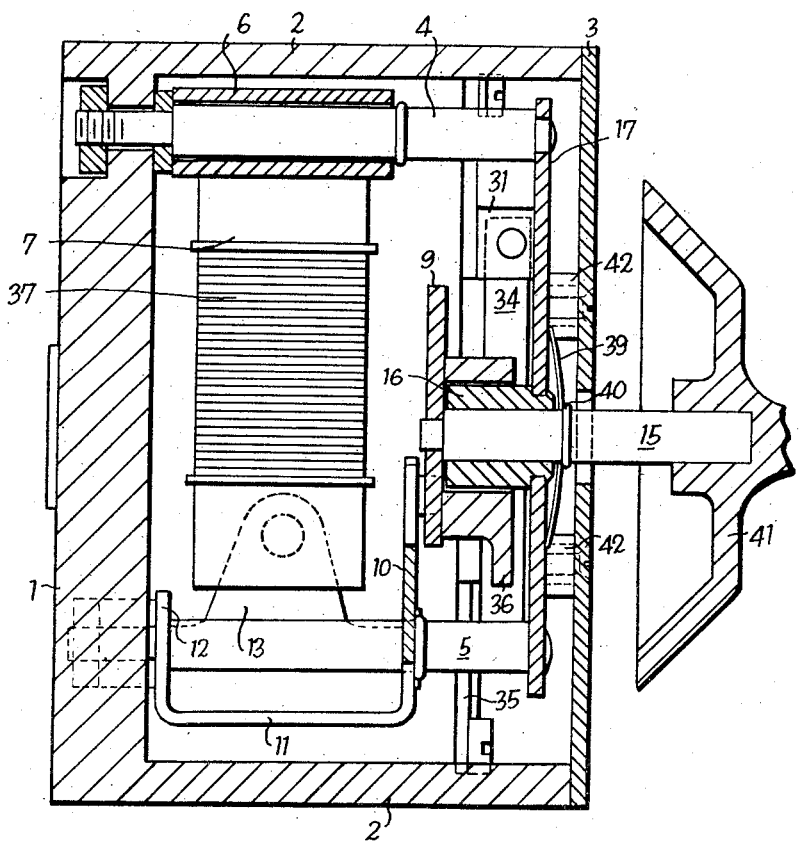

In Figs. 2 and 3 an operating knob for the spring 15 is shown at 41 and the cover plate 3 is secured to the bridge member 17 with the interposition of spacing members 42.

The spring blade 20 is set by the longitudinal position of the peg 24 in the member 21 so that the contact 25 is urged towards the contact 26. The bimetal strips 7 and 8 are arranged so as to flex their lower ends (Fig. 1) toward the left-hand with increase of temperature. When the shaft 15 is in the "off" position, the cam 36 engages with the spring blade 34 so that the contacts 32 and 33 are open. In this position of the shaft the cam 9 positions the lever 10 and the bimetal strip assembly so that the abutment 19 holds the contacts 25 and 26 open. As the shaft is turned from the "off" position to any operative position, for example that shown, the cam 36 moves clear of the blade 34 and contacts 32 and 33 close, and thereafter the cam 9 allows contacts 25 and 26 to close. When the contacts 25 and 26 are closed, current is supplied to the load and to the heating winding 37. The temperature of the bimetal strip 7 is therefore increased, and the latter moves its lower end to the left in Fig. 1. When the movement of the lower end of the strip 7 becomes sufficient to displace the abutment 19 so that the adjacent part of the switch blade 20 moves past the groove in the member 29, the contact 25 is separated from the contact 26. The load is therefore de-energized, and at the same time, the heating winding 37 is de-energized. The temperature of the strip 7 therefore falls, and after a time interval, falls sufficiently to return the abutment 19 to the position in which the contacts 25 and 26 reclose. The load is now again energized together with the winding 37. As a result, the cycle of operations above described is repeated and continues until the knob is returned to the "off" position.

It will thus be seen that the load in intermittently energized. The mean energy supplied to the load depends upon the ratio of the time for which the current is supplied to the load in relation to the total time for which the load is de-energized. If the knob is displaced further from the "off" position, then in the cold condition of the strip 7 the abutment 19 is moved still further to the right in Fig. 1, so that the temperature of the strip 7 must be increased above the previous value in order to open the contacts 25 and 26. In order that the temperature of the strip 7 shall be raised to such higher value, the contacts remain closed for a longer period, thereby increasing the time interval for which current is supplied to the load. Due to the higher temperature to which the strip 7 is now raised, the rate of cooling of said strip when the contacts open is higher than previously, so that the ratio of contact closed time to contact open time is increased.

Finally, if the knob is turned fully in the clockwise direction in Fig. 1, the position of the abutment 19 is moved so far to the right that even with the heater 37 continuously energized, the temperature of the strip 37 is not sufficient to open the contacts. The load is therefore continuously energized.

The operation of the regulator alternately to energize and de-energize the load with a ratio of corresponding time intervals dependent on the position of shaft 15 has been hereinbefore described. It remains to describe how the device is compensated for variations of ambient temperature. Variations of ambient temperature will also cause deflection of the bimetal strip 7 so that if compensating means were not provided, then the ratio obtained for each given position of the shaft 15 would vary with the ambient temperature. The bimetal strip 8, however, is included in the device and deflects in the same direction as the strip 7 with changes of ambient temperature. Increase or decrease of ambient temperature affects both strips 7 and 8 equally so that at all times the distance separating the lower ends of the strips is constant in the absence of heating of the strip 7 by the heater winding 37 thereon. Therefore, the distance of the abutment 19 from the screw 18 is constant irrespective of the ambient temperature variation. Energization of the winding 37, however, does not substantially increase the temperature of the strip 8, so that said distance is varied by the deflection of the strip 7 due to energization of the heating winding. The average energy input to the load is adjustable according to the positioning of the lever 10, and the cam 9 is given such form as to provide a desired relation between the "on-off" time ratio and the displacement of the shaft 15 from the "off" position. When the cam allows the peg 14 to move sufficiently near to the shaft 15, the temperature of the bimetal strip 7 will not reach a sufficient value to open the switch contacts so that the load is continuously energised. The cam 9 may include a horn 43 which will co-operate with the peg 14 so as positively to displace the cam follower lever out of engagement with the bimetal strip 7 in the maximum or "fully-on" position of the shaft 15, the peg 14 then riding into the slot 44 formed within the horn 43.

In the example illustrated the cam 9 is provided with a step 45 providing by co-operation with the peg 14 a positive stop for the "off" position of the shaft 15. When the shaft 15 is returned to the "off" position, namely by counterclockwise movement in Fig. 1, the circuit will first be broken at the contacts 25 and 26 and subsequently the contacts 32 and 33 will be opened. The trailing tip of the cam 36 moves past the cranked portion of the spring blade 34 so as to tend to retain the operating shaft in the "off" position. The arrangement therefore serves also as an "accentuating" device for the "off" position of the knob.

The additional switch contacts 32 and 33 provide double-pole switching in conjunction with contacts 22 and 23. In some cases a separate further switch similar to 32, 33, 34 may be provided for the double-pole switching. This further switch may for example be mounted on the base on the opposite side of the bridge member 17 to the switch 32, 33, 34 and operated by further cam surface such as 36. Where double-pole switching is not required, the contacts 32 and 33, spring blade 34 and terminal 31, together with the cam 36, may be omitted. The terminal 35 may be retained for providing connection of the one end of the winding 37 with the supply line which is connected with the terminal 35, in cases in which the winding 37 is a fine wire winding energised in parallel with the load. Where the winding 37 is connected in series with the load, for example between the contact 26 and the terminal 31, or the bimetal strip 7 is directly heated by the passage of the load circuit through the bimetal strip, the load may be connected with terminal 31 instead of with the terminal 27, on the one hand, and on the other hand with the return supply line externally of the regulator, and the contact 26 may be insulated from the terminal 27 and the heating winding 37 or the bimetal strip connected between contact 26 and terminal 27.

In a modification of the arrangement shown in Figs. 1, 2 and 3, the additional switch or switches, instead of being carried directly from the base member, is carried by insulating means from the bridge member 17, the latter being suitably formed for this purpose, the cam 36 then being of face or edge type according to the required operating movement of the additional switch or switches. One arrangement of this kind will be described with reference to Figs. 4 to 7 which illustrate a further embodiment of regulator according to the invention.

Figure 6:
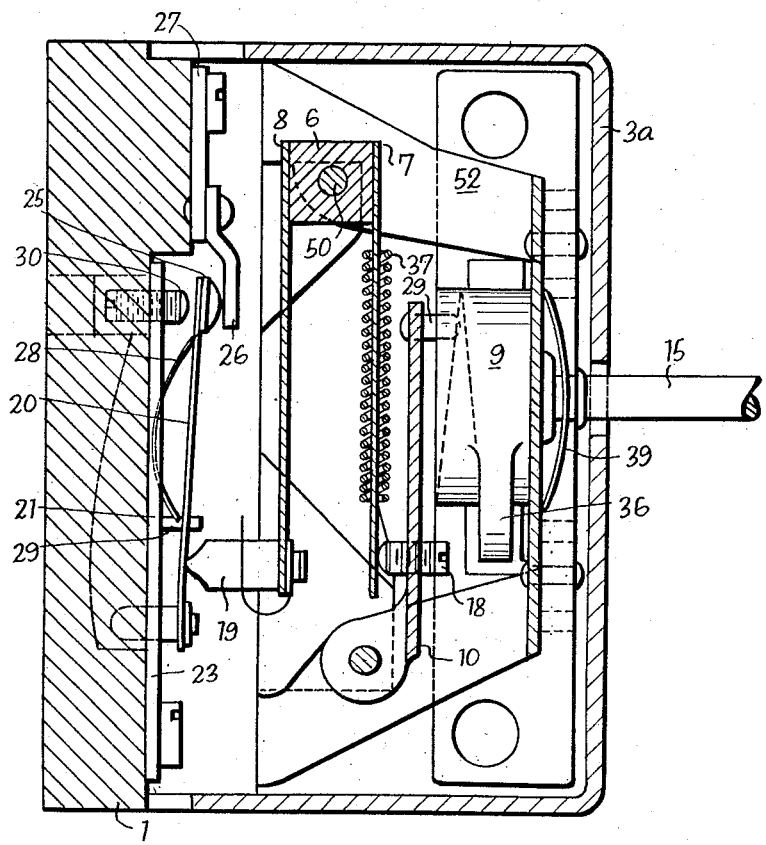
Fig. 6 is a sectional elevation taken on the line VI—VI of Fig. 5.
Figure 7:
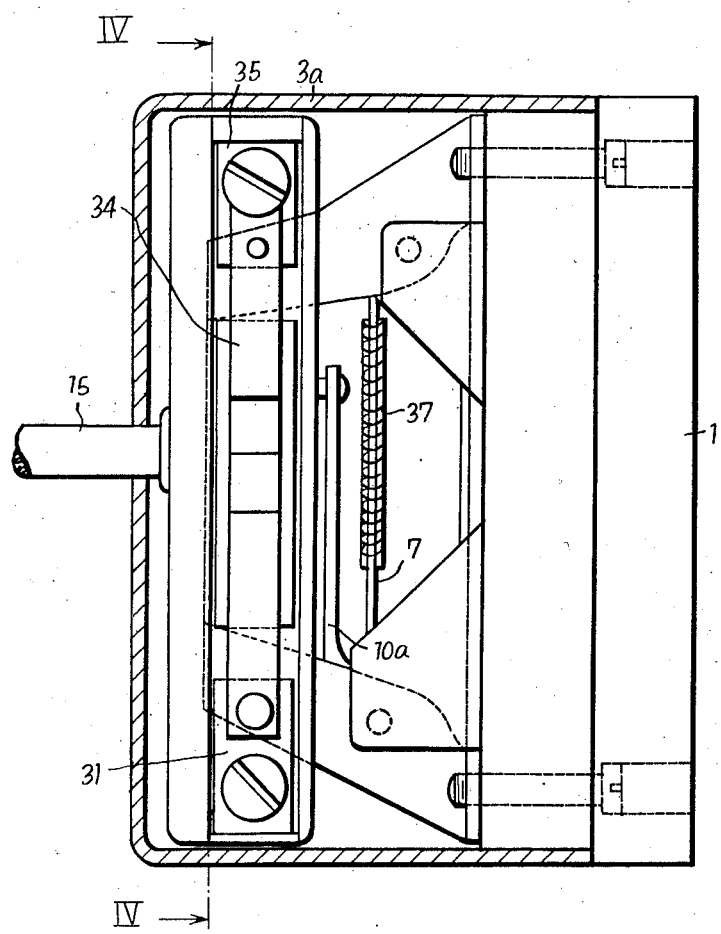
Fig. 7 is an elevation taken from the left of Fig. 4.

In the arrangement shown in Figs. 4 to 7 the spring blade 20 of the snap-action switch is mounted on the base member 1 for movement of the contact 25 perpendicularly with respect to the base member, the metal base member 21 of the switch being a flat strip as will be clear from Fig. 6. The bimetal strips 7 and 8 and also the cam follower lever 10 are mounted for movement about axes parallel with the face of the base member. The block 6 carrying the bimetal strips is supported by means of a pin 50 which is received in perforations in trunnions 51 and 52 secured to the base block by screws such as 53; the cam follower lever is provided with a pair of lugs 54 and 55 journalled on a pin 56 which is received in perforations in trunnions 57 and 58. The trunnions referred to serve also as supporting parts of the bridge member 17 and may conveniently, as in the example shown, be formed integrally with the part 17 by being bent with the latter out of a single sheet of metal. The cam 9 is of the face type as clearly shown in Fig. 6 and it will be seen that through the cam follower lever the arrangement provides for adjustment of the energy output according to the position of the shaft 15.

The pins 50 and 56 may be retained in longitudinal position by means of upstanding abutments 59 formed on the insulating base block.

As hereinbefore indicated, Figs. 4 to 7 inclusive illustrate also the mounting of an additional switch or switches, for double-pole switching, on the bridge member. In the example shown in said figures, the additional switch comprises a spring blade 34 which is secured at one end to a terminal member 35 mounted on an insulating member 60 secured to the bridge such as by the lugs 61 and rivets 62. The member 60 carries also a terminal member 31 on which is mounted a fixed contact 32. The spring blade 34 is provided with an initial set urging contact 33 into engagement with contact 32 and these contacts are adapted to be opened, as in Figs. 1, 2 and 3, by means of a cam 36. In Figs. 4 to 7 the cam 36 is shown as comprising an integral part of the cam 9. The insulating member 60 is provided with an aperture 63 through which the cam 36 projects in the "off" position of the shaft to engage the spring blade 34.

It will be clear that where a second switch is desired for double-pole switching, such further switch may be mounted on the bridge member on the opposite side of the shaft to the switch shown in Figs. 4 to 7 and the cam 36 suitably duplicated. It will further be understood that if desired arrangements in which the additional switch or switches are mounted on the bridge member may be adopted in the embodiment of the invention shown in Figs. 1, 2 and 3.

It will be seen that in the arrangments according to the invention as above described a simple and economical construction of the several parts mounted directly from the base member is provided with the further advantage that the cam follower lever may readily be arranged so that the radius of movement of the abutment engaging the bimetal strip is less than the radius of movement of the end of said lever engaging with the cam, whereby the movement of the bimetal strips is less than the rise or fall of the cam profile, for a given movement of the operating shaft. Comparatively large manufacturing tolerances in the accuracy of cam formation may then be permitted for a desired accuracy of calibration of the operating shaft.

What I claim is:

1. An electric energy regulator, comprising a snap-action switch, first and second bimetal strips rigidly secured together at adjacent ends and to common pivotal means on which said adjacent ends are mounted with the free end of the said first bimetal strip engageable with said snap-action switch for actuation of said switch by pivotal movement of said strips, a base member of block form on which the snap-action switch is mounted, a bridge member supported from the base member and extending over the bimetal strips, a rotary cam carried by said bridge member, an operating shaft for said cam extending from said bridge member on the side thereof remote from the base member, a cam-follower lever extending between said cam and a pivotal mounting on the base member on an axis substantially parallel with the pivotal axis of the bimetal strips, and located adjacent the free end of the second said bimetal strip, an abutment on said cam-follower lever located at a first radius thereon from the pivotal axis thereof and co-operating with the cam, a second abutment carried by said lever at a radius thereon from said pivotal axis less than said first radius and engageable with the free end of said second bimetal strip to position said strips in accordance with the position of said shaft, and a heating circuit for one of said strips including the contacts of said switch and cooperative with said strip alternately to open and close the switch, while the other of said strips provides compensation for variation of ambient temperature.

2. An electric energy regulator, comprising a base member of block form, a snap-action switch mounted on said base member, first and second bimetal strips rigidly secured together at adjacent ends thereof with the free end of said first bimetal strip engageable with said snap-action switch for actuation of said switch by pivotal movement of said strips, members upstanding from the base member, a bridge member supported from the base member by said upstanding members and extending over the bimetal strips, a rotary cam carried by said bridge member, an operating shaft for said cam extending from the bridge member on the side thereof remote from the base member, a cam follower lever, pivotal means mounting said strips and said lever on substantially parallel axes on said upstanding members, the pivotal axis of the cam follower lever being located adjacent the free end of said second bimetal strip and said lever extending between its pivotal axis and the cam, and the cam follower lever carrying an abutment located thereon at a first radius from the pivotal axis of said lever and engaging the cam, a second abutment carried by said lever at a radius thereon from its said pivotal axis less than said first radius and engageable with the free end of the said second bimetal strip for adjusting the setting of the regulator in accordance with the position of said shaft, and a heating circuit for one of said strips including the contacts of said switch and cooperative with said strip alternately to open and close the switch while the other of said strips provides compensation for variation of ambient temperature.

3. An electric energy regulator, comprising a base member of block form, a snap-action switch mounted on said base member, two pillars upstanding from the base member adjacent opposite edges respectively of said member, first and second bimetal strips rigidly secured together at adjacent ends thereof and pivotally mounted on one of said pillars with the free end of said first bimetal strip engageable with said snap-action switch for actuation of said switch by pivotal movement of said strips, a bridge member supported from the base member by said pillars and extending over the bimetal strips, a rotary cam carrier by said bridge member, an operating shaft for said cam extending from the bridge member on the side of the latter remote from the base member, a cam follower lever pivotally mounted on the other of said pillars on an axis located adjacent the free end of said second bimetal strip and extending between its pivotal axis and the cam, an abutment on said lever located thereon at a first radius from its pivotal axis and cooperating with the cam, a second abutment carried by said lever at a radius thereon from its pivotal axis less than said first radius and engageable with the free end of the said second bimetal strip for adjusting the setting of the regulator in accordance with the position of said shaft, and a heating circuit for one of said strips including the contacts of said switch and cooperative with said strip alternately to open and close the switch while the other of said strips provides compensation for variation of ambient temperature.

4. An electric energy regulator, comprising a base member of block form, first and second bimetal strips rigidly secured together at adjacent ends thereof and extending in spaced substantially parallel relation with one another and with the face of the base member, a snap-action switch mounted on said base member between the latter and said bimetal strips for contact movement substantially perpendicular to the said face with the free end of said first bimetal strip and engageable with said snap-action switch for actuation of said switch by pivotal movement of said strips, members upstanding from the base member, a bridge member supported from the base member by said upstanding members and extending over the bimetal strips, a rotary cam carried by said bridge member, an operating shaft for said cam extending from the bridge member on the side of the latter remote from the base member, a cam follower lever having an abutment thereon cooperating with said cam, pivotal means mounting said strips and said lever on said members on axes substantially parallel with the face of the base member, the pivotal axis of the cam follower lever being located adjacent to the free end of the second said strip and said lever extending between its said pivotal axis and the cam, and the abutment on said lever being located at a first radius thereon from the pivotal axis of said lever, a second abutment carried by said lever at a radius thereon from said pivotal axis less than said first radius and engageable with the free end of the said second bimetal strip for adjusting the setting of the regulator in accordance with the position of said shaft, and a heating circuit for one of said strips including the contacts of said switch and cooperative with said strip alternately to open and close the switch while the other of said strips provides compensation for variation of ambient temperature.

5. An electric energy regulator, comprising a base member of block form, a snap-action switch mounted on said member, first and second bimetal strips rigidly secured together at adjacent ends thereof and extending in spaced substantially parallel relation with one another and with the face of said base member, pivotal means on which said ends are mounted adjacent one edge of the base member so as to extend across the central part of the latter, with the free end of the first said bimetal strip engageable with said snap-action switch for actuation of said switch by pivotal movement of said strips, a bridge member supported from the base member and extending over the bimetal strips, a rotary cam carried by said bridge member, an operating shaft for said cam extending from the bridge member on the side of the latter remote from the base member, a cam-follower lever carrying an abutment cooperating with said cam, said cam follower lever being pivotally mounted on an axis substantially parallel with the pivotal axis of the bimetal strips and located adjacent to the free end of said second bimetal strip and said lever extending between its pivotal axis and the cam, the abutment on said lever being located at a first radius thereon from its said pivotal axis, a second abutment carried by said lever at a radius thereon from its pivotal axis less than said first radius and engageable with the free end of the second said bimetal strip for adjusting the setting of the regulator in accordance with the position of said shaft, and a heating circuit for one of said strips including the contacts of said switch and cooperative with said strip alternately to open and close the switch, while the other of said strips provides compensation for variation of ambient temperature.

6. An electric energy regulator, comprising a base member of block form, a snap-action switch mounted on said base member, two pillars upstanding from the base member adjacent opposite edges respectively of said member, first and second bimetal strips rigidly secured together at adjacent ends thereof and pivotally mounted on one of said pillars with the free end of said first bimetal strip engageable with said snap-action switch for actuation of the switch by pivotal movement of said strips, a bridge member supported from the base member by said pillars and extending over the bimetal strips, an operating shaft for said cam extending from the bridge member on the side thereof remote from the base member, a cam follower pivotally mounted on an axis adjacent to the free end of said second bimetal strip and comprising a single piece of sheet metal bent to shape consisting of a longer arm extending between the pivotal axis of the lever and the cam and carrying at its free end and located at a first radius thereon from the pivotal axis of said lever an element cooperating with the cam, a shorter arm united with the first arm by a flat portion parallel with said pivotal axis, said arms being perforated for pivotal support of said lever on an axis substantially parallel with that of the bimetal strips, and a tail portion extending from said flat portion and carrying an abutment located at a radius thereon from the pivotal axis of the cam follower lever less than said first radius and engageable with the free end of said second bimetal strip for adjusting the setting of the regulator in accordance with the position of said shaft, and a heating circuit for one of said strips including the contacts of said switch and cooperative with said strip alternately to open and close the switch while the other of said strips provides compensation for variation of ambient temperature.

7. An electric energy regulator, comprising an insulating base member of block form, a metal member secured to said base member and carrying a fixed contact, a second metal member secured to said base member and carrying a cooperating movable contact and snap-action means therefor, first and second bimetal strips rigidly secured together at adjacent ends, pivotal means on which said adjacent ends of strips are mounted with the free end of said first bimetal strip connected with said snap-action means for actuation of said movable contact by pivotal movement of said strips, a bridge member supported from the base member and extending over the bimetal strips, a rotary cam carried by said bridge member, an operating shaft for said cam extending from the bridge member on the side of the latter remote from the base member, a cam-follower lever pivotally mounted on an axis located adjacent to the free end of said second bimetal strip and at least substantially parallel with the pivotal axis of the bimetal strips, the cam follower lever extending between its said pivotal axis and the cam, an abutment carried by said lever located thereon at a first radius from its pivotal axis and cooperating with the cam, a second abutment carried by said lever at a radius thereon from its pivotal axis less than said first radius and adapted to engage with the free end of said second bimetal strip, for adjusting the setting of the regulator in accordance with the position of said shaft, and a heating circuit for one of said strips including said fixed and movable contacts and cooperative with said strip alternately to open and close said contacts, while the other of said strips provides compensation for variation of ambient temperature.

8. An electric energy regulator, comprising an insulating base member of block form, a metal member secured to said base member and carrying a fixed contact, a second metal member secured to said base member carrying a movable contact and snap-action means therefor, first and second bimetal strips rigidly secured together at adjacent ends thereof with the free end of said first bimetal strip engageable with said movable contact for actuation thereof by pivotal movement of said strips, members upstanding from the base member, a bridge member supported from the base member by said upstanding members and extending over the bimetal strips, a rotary cam carried by said bridge member, an operating shaft for said cam extending from the bridge member on the side thereof remote from the base member, a cam follower lever having an abutment thereon cooperating with said cam, pivotal means mounting said strips and said lever on substantially parallel axes on said upstanding members, the pivotal axis of the cam follower lever being located adjacent to the free end of said second bimetal strip and said lever extending between its said pivotal axis and the cam, and the abutment on said lever being located thereon at a first radius from its pivotal axis, a second abutment carried by said lever at a radius thereon from its pivotal axis less than said first radius and engageable with the free end of said second bimetal strip for adjusting the setting of the regulator in accordance with the position of said shaft, and a heating circuit for one of said strips including said fixed and movable contacts and cooperative with said strip alternately to open and close said contacts while the other of said strips provides compensation for variation of ambient temperature.

9. An electric energy regulator, comprising a snap-action switch, first and second bimetal strips secured rigidly together at adjacent ends, pivotal means on which said adjacent ends of strips are mounted with the free end of said first bimetal strip engageable with said snap-action switch for actuation thereof by pivotal movement of said strips, a base member of block form on which the snap-action switch is mounted, a bridge member supported from the base member and extending over the bimetal strips, a rotary cam carried by said bridge member, an operating shaft for said cam extending from the bridge member on the side thereof remote from the base member, a cam-follower lever pivotally mounted on an axis located adjacent to the free end of said second bimetal strip and substantially parallel with the pivotal axis of the bimetal strips, said cam follower lever extending between its pivotal axis and the cam, and having an abutment thereon located at a first radius from the pivotal axis of said lever and cooperating with the cam a second abutment carried by said lever at a radius thereon from its pivotal axis less than said first radius and engageable with the free end of said second bimetal strip for adjusting the setting of the regulator in accordance with the position of said shaft, a heating circuit for one of said strips including the contacts of said switch and cooperative with said strip alternately to open and close the switch, while the other of said strips provides compensation for variation of ambient temperature, further switch contacts, means operable by said shaft to open said further contacts in an "off" position of the shaft and to close said further contacts in operative positions of the shaft, and means for connecting the several switch contacts and terminal members for the supply and for the load to provide double-pole switching for deenergizing the load in said "off" position of the shaft.

10. An electric energy regulator, comprising a base member of block form, a snap-action switch mounted on said base member, first and second bimetal strips rigidly secured together at adjacent ends thereof with the free end of said first bimetal strip engageable with said snap-action switch for actuation of said switch by pivotal movement of said strips, members upstanding from the base member, a bridge member supported from the base member by said upstanding members and extending over the bimetal strips, a rotary cam carried by said bridge member, an operating shaft for said cam extending from the bridge member on the side thereof remote from the base member, a cam follower lever carrying an abutment cooperating with said cam, pivotal means mounting said strips and said lever on substantially parallel axes on said upstanding members, the pivotal axis of the cam follower lever being located adjacent to the free end of said second bimetal strip and said lever extending between its said pivotal axis and the cam, and the abutment carried by said lever being located thereon at a first radius from the pivotal axis thereof, a second abutment carried by said lever at a radius thereon from its pivotal axis less than said first radius and engageable with the free end of said second bimetal strip for adjusting the setting of the regulator in accordance with the position of said shaft, a heating circuit for one of said strips including the contacts of said switch and cooperative with said strip alternately to open and close the switch while the other of said strips provides compensation for variation of ambient temperature, further switch contacts, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

11. An electric energy regulator comprising a base member of block form, a snap-action switch mounted on said base member, two pillars upstanding from the base member adjacent opposite edges respectively of said member, first and second bimetal strips rigidly secured together at adjacent ends thereof and pivotally mounted on one of said pillars with the free end of said first bimetal strip engageable with said snap-action switch for actuation of said switch by pivotal movement of said strips, a bridge member supported from the base member by said pillars and extending over the bimetal strips, a rotary cam carried by said bridge member, an operating shaft for said cam extending from the bridge member on the side thereof remote from the base member, a cam follower lever having an abutment thereon co-operating with said cam and pivotally mounted on the other of said pillars on an axis located adjacent to the free end of said second bimetal strip, the cam follower lever extending between its said pivotal axis and the cam, and the abutment on said lever being located thereon at a first radius from the pivotal axis of said lever, a second abutment carried by said lever at a radius thereon from its pivotal axis less than said first radius and engageable with the free end of said second bimetal strip for adjusting the setting of the regulator in accordance with the position of said shaft, a heating circuit for one of said strips including the contacts of said switch and cooperative with said strip alternately to open and close the switch while the other of said strips provides compensation for variation of ambient temperature, further switch contacts, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

12. An electric energy regulator, comprising a base member of block form, first and second bimetal strips rigidly secured together at adjacent ends thereof and extending in spaced substantially parallel relation with one another and with the face of the base member, a snap-action switch mounted on said base member between the latter and said bimetal strips for contact movement substantially perpendicular to the base face and with the free end of said first bimetal strip engageable with said snap-action switch for actuation of said switch by pivotal movement of said strips, members upstanding from the base member, a bridge member supported from the base member by said upstanding members and extending over the bimetal strips, a rotary cam carried by said bridge member, an operating shaft for said cam extending from the bridge member on the side of the latter remote from the base member, a cam follower lever having an abutment thereon co-operating with said cam, pivotal means mounting said strips and said lever on said members on axes substantially parallel with the face of the base member, the pivotal axis of the cam follower lever being located adjacent to the free end of said second bimetal strip and said lever extending between its said pivotal axis and the cam, and the abutment on said lever being located thereon at a first radius from the pivotal axis of said lever, a second abutment carried by said lever at a radius thereon from its pivotal axis less than said first radius and engageable with the free end of said second bimetal strip for adjusting the setting of the regulator in accordance with the position of said shaft, a heating circuit for one of said strips including the contacts of said switch and cooperative with said strip alternately to open and close the switch while the other of said strips provides compensation for variation of ambient temperature, further switch contacts, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

13. An electric energy regulator, comprising a base member of block form, a snap-action switch mounted on said member, first and second bimetal strips rigidly secured together at adjacent ends thereof and extending in spaced substantially parallel relation with one another and with the face of said base member, pivotal means on which said ends are mounted adjacent one edge of the base member so as to extend across the central part of the latter, with the free end of said first bimetal strip engageable with said snap-action switch for actuation of said switch by pivotal movement of said strips, a bridge member supported from the base member and extending over the bimetal strips, a rotary cam carried by said bridge member, an operating shaft for said cam extending from the bridge member on the side thereof remote from the base member, a cam-follower lever having an abutment thereon cooperating with said cam and pivotally mounted on an axis substantially parallel with the pivotal axis of the bimetal strips, the pivotal axis of the cam follower lever being located adjacent to the free end of said second bimetal strip and said lever extending between its said pivotal axis and the cam, and the abutment on said lever being located thereon at a first radius from the pivotal axis of said lever, a second abutment carried by said lever at a radius thereon from its pivotal axis less than said first radius and engageable with the free end of the second said bimetal strip for adjusting the setting of the regulator in accordance with the position of said shaft, a heating circuit for one of said strips including the contacts of said switch and cooperative with said strip alternately to open and close the switch, while the other of said strips provides compensation for variation of ambient temperature, further switch contacts, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

14. An electric energy regulator, comprising an insulating base member of block form, a metal member secured to said base member, and carrying a fixed contact, a second metal member secured to said base member and carrying a co-operating movable contact and snap-action means therefor, first and second bimetal strips rigidly secured together at adjacent ends thereof with the free end of said first bimetal strip engageable with said movable contact for actuation thereof by pivotal movement of said strips, members upstanding from the base member, a bridge member supported from the base member by said upstanding members and extending over the bimetal strips, a rotary cam carried by said bridge member, an operating shaft for said cam extending from the bridge member on the side thereof remote from the base member, a cam follower lever having an abutment thereon co-operating with said cam, pivotal means mounting said strips and said lever on substantially parallel axes on said upstanding members, the pivotal axis of the cam follower lever being located adjacent to the free end of said second bimetal strip and said lever extending between its said pivotal axis and the cam, and the abutment on said lever being located thereon at a first radius from the pivotal axis of said lever, a second abutment carried by said lever at a radius thereon from its pivotal axis less than said first radius and engageable with the free end of said second bimetal strip for adjusting the setting of the regulator in accordance with the position of said shaft, a heating circuit for one of said strips including said contacts and cooperative with said strip alternately to open and close said contacts while the other of said strips provides compensation for variation of ambient temperature, further switch contacts, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

15. An electric energy regulator, comprising a snap-action switch, first and second bimetal strips rigidly secured together at adjacent ends, pivotal means on which said adjacent ends of the strips are mounted with the free end of said first bimetal strip engageable with said snap-action switch for actuation thereof by pivotal movement of said strips, a base member of block form on which the snap-action switch is mounted, a bridge member supported from the base member and extending over the bimetal strips, a rotary cam carried by said bridge member, an operating shaft for said cam extending from said bridge member on the side thereof remote from the base member. A cam-follower lever having an abutment thereon co-operating with said cam and pivotally mounted on an axis substantially parallel with the pivotal axis of the bimetal strips, the pivotal axis of the cam follower lever being located adjacent to the free end of said second bimetal strip and said lever extending between its said pivotal axis and the cam, and the abutment on said lever being located thereon at a first radius from the pivotal axis of said lever, a second abutment carried by said lever at a radius thereon from its pivotal axis less than said first radius and engageable with the free end of said second bimetal strip for adjusting the setting of the regulator in accordance with the position of said shaft, a heating circuit for one of said strips including the contacts of said switch and cooperative with said strip alternately to open and close the switch, while the other of said strips provides compensation for variation of ambient temperature, further switch contacts mounted on said bridge member, means operable by said shaft to open said further contacts in an "off" position of the shaft and to close said further contacts in operative positions of the shaft, and circuit connections between the several switch contacts and terminal members for the supply and for the load to provide double-pole switching for de-energising the load in said "off" position of the shaft.

THOMAS STUART ASHE.

References Cited in the file of this patent

UNITED STATES PATENTS

| Number | Name | Date |
|---|---|---|
| 2,172,189 | Clark | Sept. 5, 1939 |
| 2,486,888 | Schleicher | Nov. 1, 1949 |
| 2,487,204 | Woolnough | Nov. 8, 1949 |

FOREIGN PATENTS

| Number | Country | Date |
|---|---|---|
| 517,538 | Great Britain | Feb. 1, 1940 |